July 4, 1967
J. K. ROSE
3,329,770
LIGHT SHIELD
Filed April 1, 1964
4 Sheets-Sheet 1
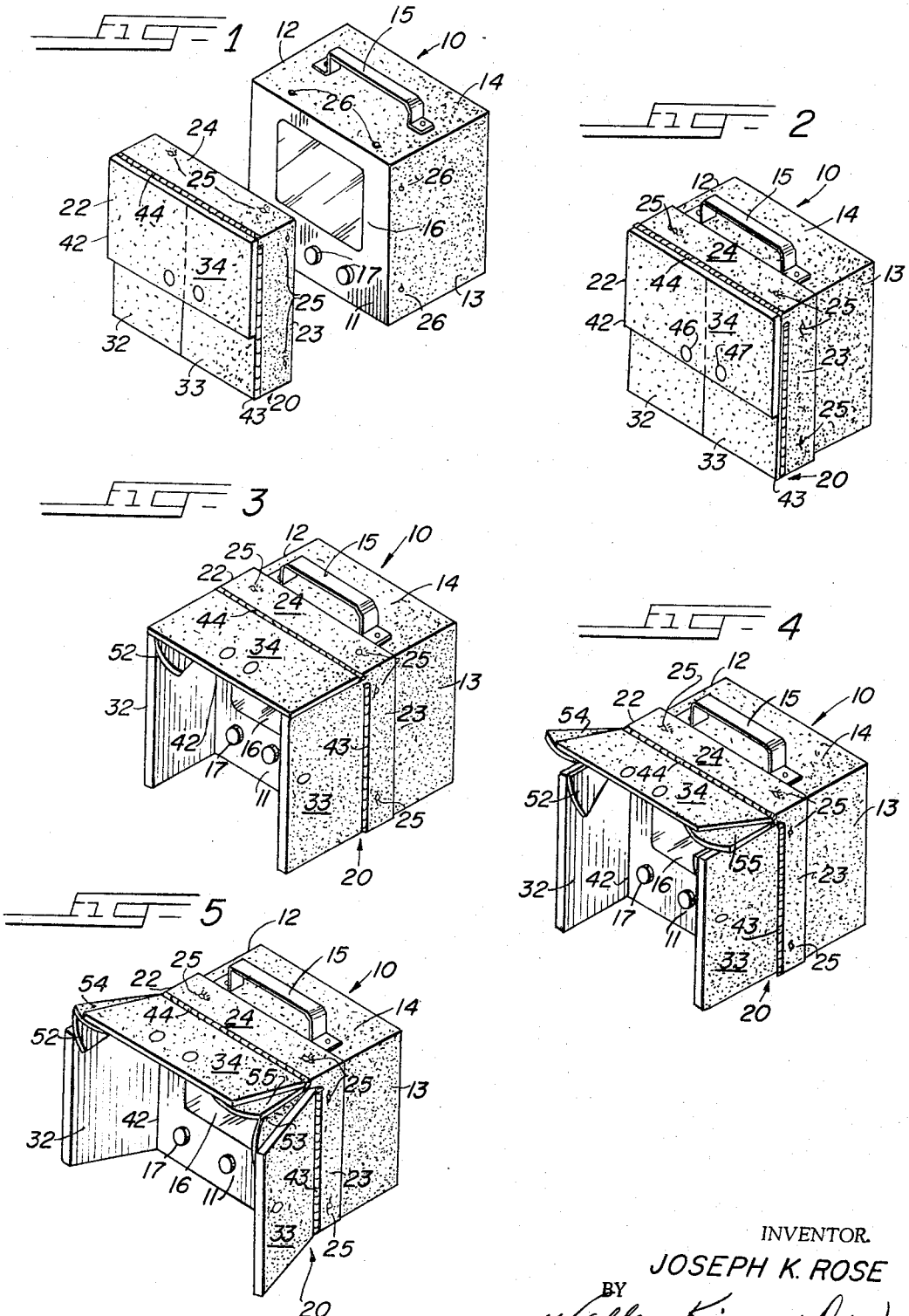
INVENTOR.
JOSEPH K. ROSE
BY
Wallace, Kinzer & Dorn
ATTYS.

July 4, 1967  J. K. ROSE  3,329,770
LIGHT SHIELD
Filed April 1, 1964  4 Sheets-Sheet 2
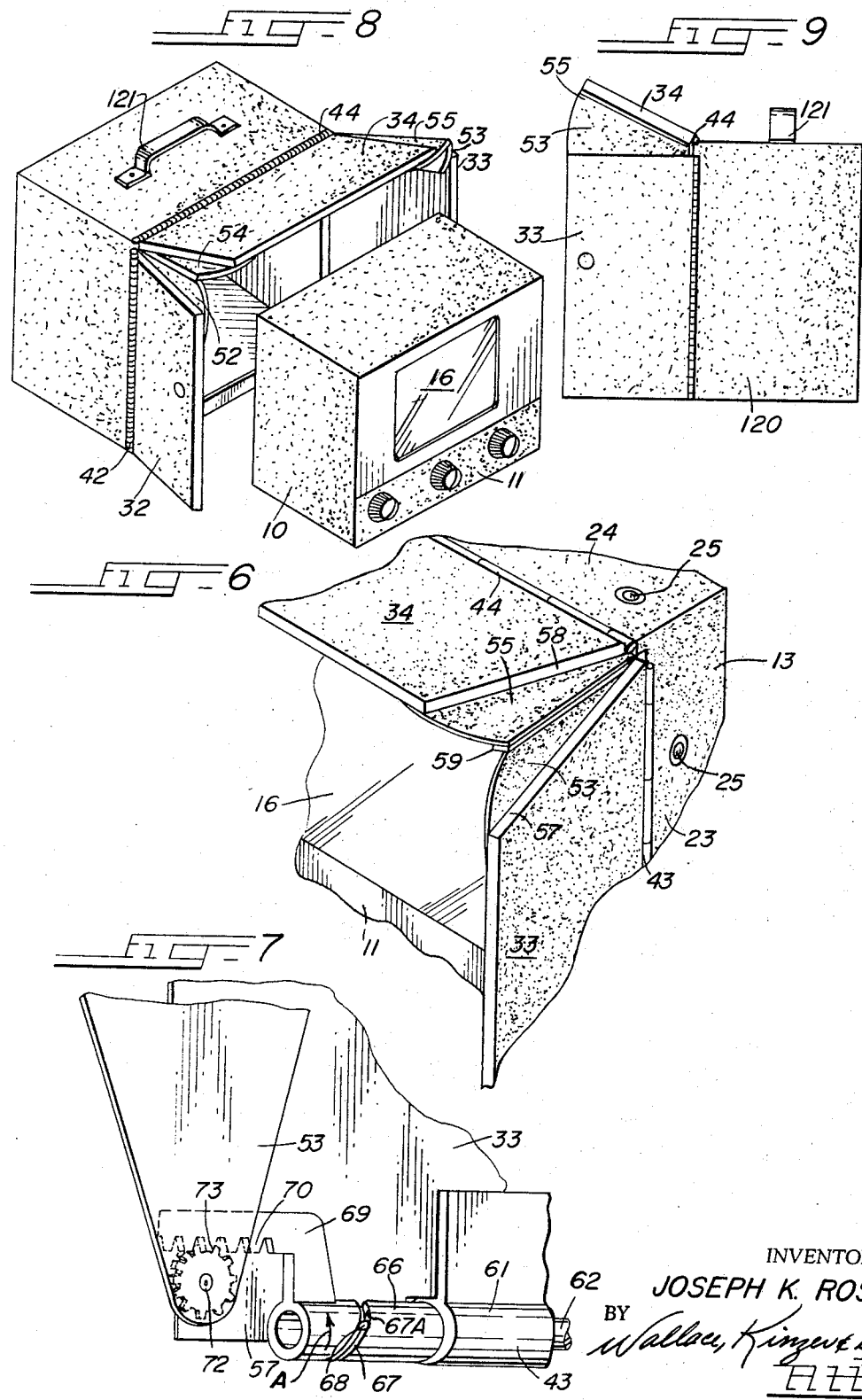
INVENTOR.
JOSEPH K. ROSE

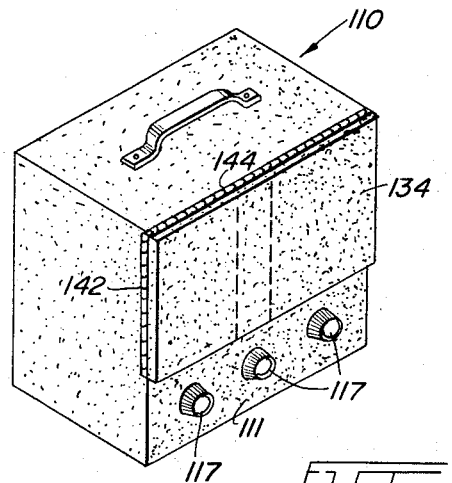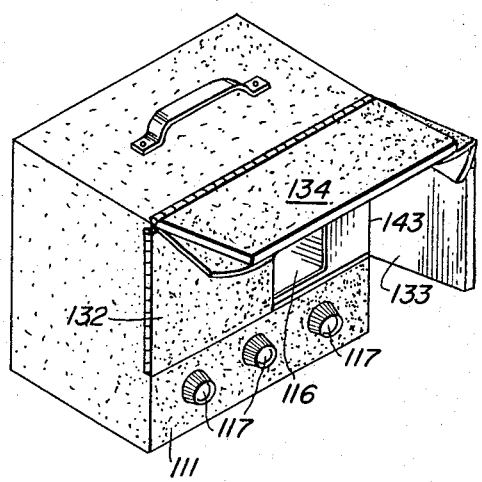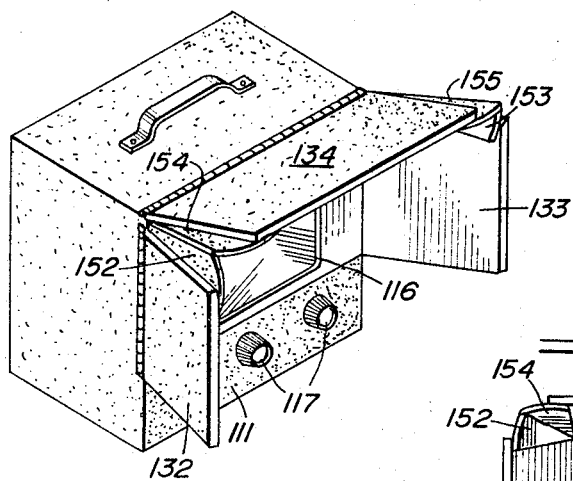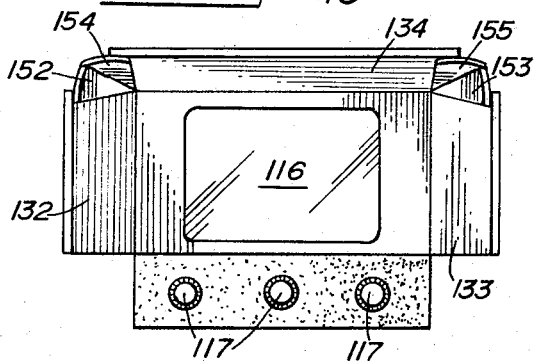

July 4, 1967  J. K. ROSE  3,329,770
LIGHT SHIELD
Filed April 1, 1964  4 Sheets-Sheet 4
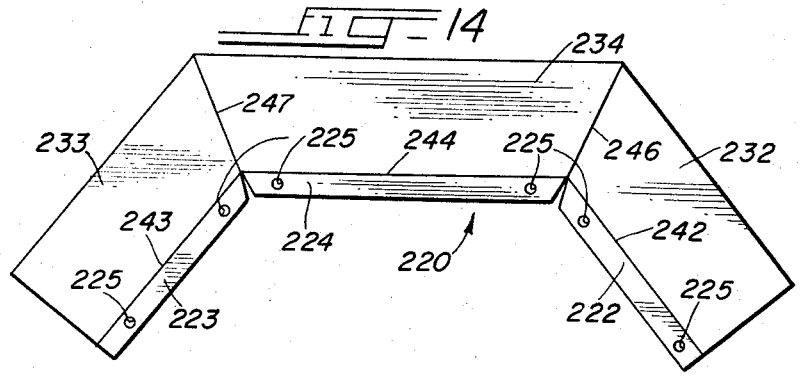
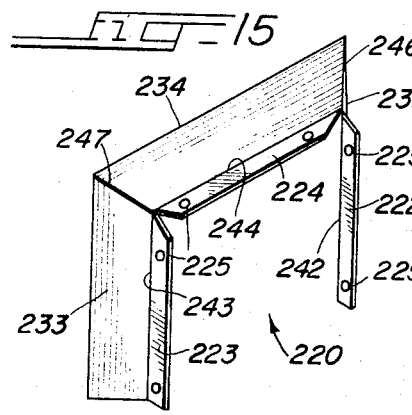
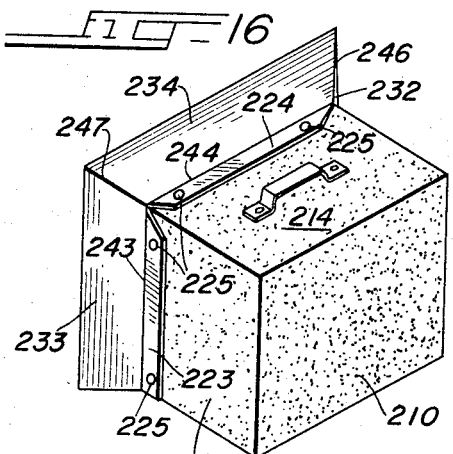
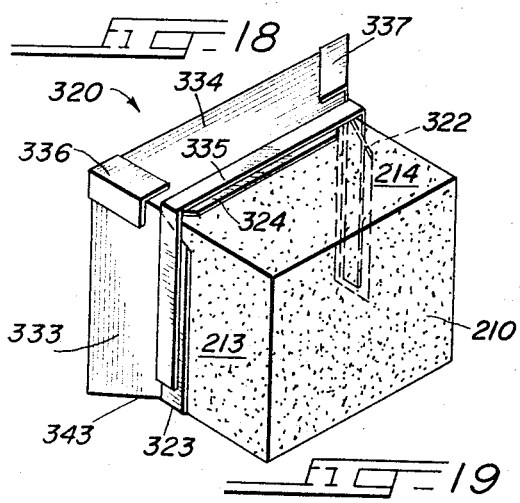
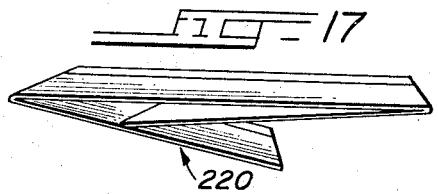
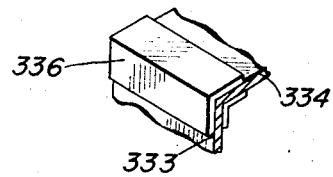
INVENTOR.
JOSEPH K. ROSE
BY
Wallace Kinzer & Dorn
ATTYS.

United States Patent Office 3,329,770
Patented July 4, 1967

3,329,770
LIGHT SHIELD
Joseph K. Rose, 1116 Linden Ave.,
Highland Park, Ill. 60035
Filed Apr. 1, 1964, Ser. No. 356,407
10 Claims. (Cl. 178—7.9)

This invention relates to a new and improved light shield for a television receiver, oscilloscope, slide viewer, front or rear projection screen devices, or like image exhibiting apparatus. Although the invention is applicable to a wide variety of image display devices, it is particularly advantageous when employed with a television receiver and is described hereinafter in that connection.

A number of different constructions have heretofore been proposed for light shields to be used with television receivers, oscilloscopes, slide viewers, radar display devices, and similar image exhibiting devices of the kind comprising an illuminated image exhibiting member facing outwardly of a cabinet wall. As used herein, the term "illuminated image exhibiting member" refers to any viewing screen or other image surface that presents an illuminated image, including particularly cathode ray image display devices, oscilloscopes, front and rear projection viewing screens, and the like. The simplest and perhaps the oldest proposal in this regard is a fixed light shield projecting outwardly of the image exhibiting member; a fixed construction of this kind, however, is quite impractical as applied to portable instruments and television receivers because it adds excessive bulkiness to the device with which it is employed and detracts from their appearance.

Other light shield constructions known heretofore have employed pivotally mounted panels or folding panels that are retractable into the cabinet of the image display device or that may be folded around the edges of the device. Two excellent examples of the latter type of light shield construction are described and claimed in the patents of Joseph K. Rose, No. 3,062,917, issued Nov. 6, 1962 and No. 3,087,014, issued Apr. 23, 1963. The shield construction shown in these two patents can be folded or retracted, relative to the cabinets of the instruments with which they are used, yet afford effective light shields for the instruments.

In the present invention, a folding light shield is provided that can be made to virtually any required depth, the shield panels usually overlapping when in their closed positions. The deeper light shield made possible by the invention affords improved shielding of the image.

In many instances it is desirable to provide a light shield that is completely removable from the instrument with which it is employed. This is particularly true where the light shield is marketed as a unit, either a removable cover or a carrying case, that is separate from the television receiver, oscilloscope, or other image display device.

Moreover, and particularly with portable instruments or television receivers, it is often desirable to afford a rigid protective cover for the cathode ray tube or other image exhibiting member with which the light shield is employed, when the image exhibiting member is not in use. At the same time, and especially where the light shield must be merchandised as a separate attachment for a television receiver or similar instrument, the cost of the shield is frequently a controlling factor.

It is an object of the present invention, therefore, to provide a new and improved combined protective cover and light shield for a television receiver, oscilloscope, slide viewer, or like image exhibiting apparatus that is relatively inexpensive yet capable of performing the dual functions of a complete protective cover and an effective light shield.

A further object of the invention is to provide a new and improved light shield assembly for a television receiver, oscilloscope, projection viewer or the like that may be quickly and conveniently mounted in light shielding position on the image exhibiting apparatus.

Another object of the invention is to provide a compact, folded unitary assembly of light shield panels that can be quickly and conveniently opened up to afford an effective light shield for an illuminated image-exhibiting member and that can as easily be refolded to their original compact position.

A particular object of the invention is to provide a new and improved protective cover, for the image exhibiting member of a television receiver or like instrument, that also is capable of functioning as an effective light shield for the instrument.

A specific object of the invention is to provide a new and improved carrying case, for a portable television receiver, oscilloscope, or other illuminated image display device, that includes a complete protective cover for the viewing screen of the device and the controls thereof, yet functions as an effective light shield when the display device is in use.

Another object of the invention is to provide a new and improved multi-panel construction for a combined protective cover and light shield for an image exhibiting member, in which the shield panels fold over the image exhibiting member to afford the desired cover and are pivoted outwardly to an obtuse angle with respect to that member to function as a light shield, in which the ends of the individual shield panels are automatically extended when, and only when, the shield panels are moved beyond a given angle with respect to the image exhibiting member.

Another object of the invention is to reduce eyestrain, in use of an illuminated image exhibiting member, by increasing the brightness of the area adjacent to and encompassing the image.

A particular object of the invention is to provide a new and improved combined protective cover and light shield for a portable television receiver, oscilloscope, projection viewer, or the like that is inexpensive in construction yet easily adapted for use in a face cover, in a carrying case, or as an integral part of the cabinet of the device.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a perspective view showing a portable television receiver and a combined protective cover and light shield constructed in accordance with one embodiment of the present invention, the protective cover and light shield being dismounted from the television receiver;

FIG. 2 is a perspective view showing the protective cover and light shield of FIG. 1 in mounted operative position with respect to the television receiver;

FIG. 3 is a perspective view showing the protective cover and light shield open to its most limited viewing position;

FIG. 4 illustrates a transitional position for the light shield with the top panel thereof pivoted beyond the position shown in FIG. 3;

FIG. 5 is a perspective view showing the light shield in full open position;

FIG. 6 is a detail view illustrating auxiliary shield members employed to complete the light shield when in the full open position of FIG. 5;

FIG. 7 is a detail view of one form of operating mechanism for the auxiliary shield members;

FIG. 8 is a perspective view of a modification of the present invention in which the protective cover and light shield is incorporated in a carrying case for a portable television receiver;

FIG. 9 is a side elevation view of the embodiment of FIG. 8;

FIG. 10 is a perspective view of another modification of the present invention in which the protective cover and light shield is constructed as an integral part of a television receiver cabinet, the cover being shown in closed condition;

FIG. 11 illustrates the protective cover and light shield of FIG. 10 in partially open position;

FIG. 12 is a perspective view showing the protective cover and light shield of FIG. 10 in full open light shielding position;

FIG. 13 is a front elevational view of the embodiment of FIGS. 10–12;

FIG. 14 is a plan view of a light shield constructed in accordance with another embodiment of the invention, showing the configuration of the shield panels employed therein;

FIG. 15 is a perspective view showing the light shield of FIG. 14 ready for use;

FIG. 16 illustrates the light shield of FIGS. 14 and 15 mounted in position of use on a television receiver;

FIG. 17 shows the light shield of FIG. 14 as folded for storage or transportation;

FIG. 18 is a perspective view, similar to FIG. 16, illustrating a different mounting arrangement for a light shield like that of FIGS. 14–17; and FIG. 19 is a detail view of a corner mounting and reinforcing member used in the construction illustrated in FIG. 18.

The apparatus shown in FIG. 1 includes a television receiver 10 of conventional construction and a combination cover and light shield device 20 constructed in accordance with one embodiment of the present invention. The television receiver includes a cabinet, which may be made of metal, wood, plastic or other suitable material, the cabinet comprising a front wall 11, side walls 12 and 13, and a top wall 14. The top wall 14 of the cabinet may have a suitable handle 15 mounted thereon. The front wall 11 of the cabinet for television receiver 10 is provided with a suitable opening encompassing the face of a conventional picture tube 16, picture tube 16 constituting the image exhibiting member of the television receiver. In addition, television receiver 10 may be provided with suitable controls as indicated by the control knobs 17.

The cover and light shield device 20 comprises a rectangular frame including side frame members 22 and 23 and a top member 24. A bottom frame may be provided to complete the rectangle, although this is not always essential. The construction of the frame 22–24 is such that it can be fitted over the front of the television receiver 10.

The individual frame members 22–24 are provided with a plurality of fastening members 25, located at positions corresponding to complementary fastening members 26 mounted upon the side and top walls of the cabinet of television receiver 10. Fastening members 25 and 26 may be of any suitable construction; for example, they may constitute mating complementary snap fasteners of conventional construction. On the other hand, short pins may be mounted on frame 22–24 as the fastening members 25, in which case the fastening elements 25 on the television cabinet may be constructed as suitable pin-receiving holes or cavities in the cabinet walls. Other fastening means may be employed as desired, including simply a close frictional fit between frame members 22–24 and cabinet walls 12–14.

Although frame members 22–24 are preferably of relatively rigid construction and are fabricated from some suitable material as sheet plastic, sheet metal, or relatively thin wood, a more flexible material may be used for the frame members. Thus, a flexible plastic or even leather may be employed to fabricate the frame members of device 20.

The combined protective cover and light shield 20 further includes a plurality of shield panels 32, 33 and 34. Shield panel 32 is pivotally mounted upon frame member 22 by means of a hinge or series of hinges 42. Similar mounting arrangements, comprising the hinges 43 and 44, are employed to mount panels 33 and 34 on frame members 23 and 24, respectively. As shown in FIG. 1, panels 32–34, when folded together, cover the open face of frame 22–24.

FIG. 2 shows the protective cover and light shield device 20 mounted on television receiver 10, the shield being closed. Mounting of the shield and cover device 20 is effected by moving the frame 22–24 into encompassing relation with respect to the forward edges of cabinet walls 12–14. The fastening elements 25 and 26 are brought together into mating engagement, simply being pushed together if snap fasteners are employed. It is thus seen that the device 20 is rigidly and firmly mounted on the television receiver cabinet in encompassing relation to the front wall 11 of the television receiver. With the panels 32–34 in the illustrated positions, a complete protective cover is afforded for the front cabinet wall 11, covering both the image exhibiting member 16 and the controls 17.

To hold the cover fully closed, snap fasteners or other suitable inexpensive fastening means 46 and 47 may be provided upon shield panel 34 to engage complementary fastening members on the two side panels 32 and 33 and hold the cover closed.

As best shown in FIGS. 4 and 5, side panel 32 of protective cover and shield device 20 is provided with an auxiliary shield member 52 that is mounted adjacent the top edge of the panel. A similar auxiliary shield member 53 is mounted near the top edge of side panel 33. Top panel 34, on the other hand, carries two auxiliary shield members 54 and 55, located at the left and right-hand edges of the panel, respectively.

Auxiliary shield member 52 is pivotally mounted upon shield panel 32, the pivotal axis being located immediately adjacent hinge 42 on the inner edge of panel 32. The auxiliary shield member is mechanically connected to hinge 42 to be pivoted outwardly upon movement of panel 32 beyond a given angle with respect to cabinet wall 11 and thereby increase the planar area of panel 32. In the illustrated construction, the selected angle at which movement of the auxiliary panel commences is 90°. Thus, as long as panel 32 is in its closed position or is pivoted outwardly of cabinet wall 11 by less than 90°, auxiliary shield member 52 remains in the position shown in FIGS. 3 and 4 and does not project beyond the confines of panel 32.

If panel 32 is moved outwardly through an angle greater than 90°, however, auxiliary shield member 52 is pivoted upwardly of panel 32, projecting beyond the top edge of panel 32. Similar mounting arrangements are provided for each of the auxiliary shield members 53, 54 and 55. In each instance, the auxiliary shield member remains confined within the outline of its associated shield panel until that panel is pivoted to an obtuse angle relative to cabinet wall 11. The greater the angle of displacement, beyond 90°, of the shield panel, the greater the pivotal movement of the auxiliary shield member and the greater its projection from the edge of the main shield panel.

The side panels 32 and 33 are generally made so that they will open to the maximum angle of about 120° from their closed positions as illustrated in FIGS. 1 and 2. The hinge for the top panel 34 is constructed to permit opening of this panel through an angle somewhat greater than the maximum angle for the side panels so that the top panel can be brought down into engaging relation with the side panels when the latter are in open position.

When television receiver 10 is placed in use, with the cover and shield device 20 mounted on the receiver, panel 34 is first opened, being pivoted through an angle slightly greater than 120° from the closed position shown in FIG. 2 to the open position illustrated in FIG. 4. Hinge friction holds the top panel open. Panels 32 and 33 are then opened, usually through angles of approximately 120°, from their closed positions. FIG. 4 shows the side panels partly open, at the point at which the auxiliary panels 52 and 53 begin to pivot upwardly of the top edges of the shield panels. The pivotal movement of each of panels 32 and 33 is continued to the full open position shown in FIG. 5, with auxiliary panels 52 and 53 extended well above the top edges of the shield panels. Top panel 34 is then lowered to an angle of about 120° relative to its original closed position, until its auxiliary panels 54 and 55 engage the side auxiliary panels 52 and 53 respectively. That is, the outer edge of auxiliary panel 55 lines up with the outer edge of auxiliary panel 53 and the outer edge of auxiliary panel 54 is aligned with the top edge of auxiliary panel 52. As shown in FIG. 5, this completes a light-tight three-sided shield.

If panels 32 and 33 have not been opened by equal amounts, the amounts by which their auxiliary panels are extended will not be equal. This is easily corrected by moving either one of the side panels to equalize the angles and thereby equalize the extensions of the auxiliary shield panels.

Thereafter, when use of receiver 10 is completed and it is desired to close the cover for the device, as when moving the receiver to another location, panel 34 is first lifted through a slight angle to free its auxiliary panels 54 and 55 from engagement with the auxiliary side panels 52 and 53. Panels 32 and 33 are then folded to closed position and panel 34 is then folded over the two side panels. With each of panels 32-34 thus returned to its first or closed position adjacent television cabinet wall 11 (FIG. 2) the panels again overlap each other and cover image exhibiting member 16. In the embodiment illustrated in FIGS. 1-5, the controls 17 are also covered, shielding all of the potentially breakable components of television receiver 10 from external damage. In other embodiments, as discussed hereinafter, the controls 17 may be left exposed.

Because of particularly adverse external light conditions, it may happen that a greater amount of light shielding is required in a particular environment. Under these circumstances, and if the full angle of vision afforded by the shield when in the position of FIG. 5 is not required, the shield may be opened to a lesser angle. To this end, panel 34 is raised to some point beyond 90° as, for example, to an angle of about 115°. The friction of hinge 44 holds the top panel in this position.

Panels 32 and 33 are then pivoted outwardly from their closed positions through an angle of less than 115°, as, for example, an angle of about 110°. The panel 34 is then pivoted downwardly until its auxiliary panels 54 and 55 engage the side auxiliary panels 52 and 53 respectively. The outer edges of the auxiliary panels always come into meeting engagement when the three main shield panels are open to the same angular extent.

For most image exhibiting equipment, the least angle through which the shield panels 32-34 can be opened and yet serve effectively is the 90° open position illustrated in FIG. 3. This position, however, is not desirable for most viewing requirements because of the severely restricted angle of view. Accordingly, it may be considered as the lower limit of opening for viewing positions of the light shield, it being recognized that in almost all instances the shield will be opened to a greater extent to afford an improved angle of vision.

In the shield-cover device 20, the auxiliary shield panels 52-55 are illustrated as being exposed on the inside surfaces of the main shield panels 32-34 (FIGS. 3-5). This form of construction has been illustrated solely for convenience and clarity in the drawings. The auxiliary shield panels may also be arranged so that they retract into recesses in the main shield panels, and hence are exposed only when the main shield panels are opened beyond 90°. A recessed construction of this kind gives a more pleasing appearance to the shield.

FIG. 6 is a detail view, on an enlarged scale, showing the positions of the several members of device 20, at the corner formed by shield panels 33 and 34, when the shield panels 33 and 34 are in their fully extended positions. As shown therein, auxiliary shield member 53 projects upwardly of the top edge 57 of panel 33. Auxiliary shield member 55 projects outwardly of the right-hand edge 58 of panel 34 to the same extent. Consequently, the two shield members 53 and 55 meet with each other along a linear contact and complete the corners of the light shield.

To assure a light-tight shield, a relatively thin pad 59 of resilient material, such as felt, foamed plastic, foam rubber, or fabric, may be secured to one of the auxiliary shield members 53 and 55 along the edge of the shield member that engages the mating auxiliary shield member. In the arrangement shown in FIG. 6, pad 59 is secured to the outer edge of auxiliary shield member 55. Pad 59 has the further advantage of cushioning the top panel 34 with respect to side panel 33 when the cover is closed, preventing marring of side panel 33 and assuring tight closure of the cover.

There are a number of different mechanical arrangements that may be employed to provide automatic extension of the auxiliary shield members 52-55 in response to opening of their related shield panels. Two mechanical devices that may be adapted for this purpose are shown in detail in the aforementioned Patent No. 3,087,014 of J. K. Rose. One of these devices is illustrated in FIG. 7.

Thus, and as shown in FIG. 7, the hinge 43 may comprise a series of lugs 61 which encompass a hinge pintle 62. The portion of the hinge pintle 62 projecting beyond the end hinge lug 61 is of reduced diameter and is encompassed by a sleeve 66 which is affixed to and which rotates with the hinge lug. Sleeve 66 is provided with a helical slot 67 that terminates in a circular portion 67A. A pin 68 secured to hinge pintle 62 projects into slot 67. A rack 69 is rigidly affixed to sleeve 66. The teeth 70 on rack 69 engage a pinion 73 mounted upon a pivot pin 72. Pivot pin 72 constitutes the pivotal mounting for auxiliary shield member 53 and is secured to the edge portion 57 of shield panel 33.

The movement of panel 33 that takes place in opening the panel from its first or cover position toward its range of light shielding positions is, as will be apparent from FIGS. 3-5, a rotational movement about the axis of pintle 62 as shown by arrow A in FIG. 7, outwardly of the cabinet wall. In the initial portion of this rotational movement, pin 68 moves through the circular portion 67A of slot 67, which has no effect upon the position of auxiliary shield member 53. After panel 33 is moved through an angle of 90°, pin 68 enters the helical portion of slot 67. Continued rotational movement, accordingly, drives sleeve 66 to the left along pintle 62. This axial movement of sleeve 66 is translated, through rack 69 and gear 73, into rotational movement of auxiliary shield member 53, pivoting the auxiliary shield member about pin 72, outwardly of the edge of panel 33. In this manner, the auxiliary shield member is automatically rotated to its extended position by an amount commensurate with the continued movement of panel 33 beyond the 90° relationship with respect to the front wall of the television receiver cabinet. For a more detailed description of the basic hinge mechanism, reference may be made to the aforementioned Patent No. 3,087,014.

It will be recognized that other mechanical arrangements can be used to move the auxiliary shield members, either pivotally or linearly, to their extended positions as an incident to movement of the light shield panels to their open viewing positions. Thus, another rack and pinion mechanism that may be employed, with modification to delay the movement until the shield panels are opened 90°, is that shown in FIGS. 24 and 25 of aforementioned Patent No. 3,087,014. Alternatively, a spring drive with a movable limiting stop can be utilized for each of the auxiliary shield members.

It is common practice to utilize a relatively dark finish for the external cabinets of portable television receivers, oscilloscopes, slide viewers, and like image exhibiting devices. This is quite desirable, particularly with portable receivers and other instruments which may be taken into relatively dirty environments. It has been demonstrated, however, that a bordering area having a low diffuse reflection factor (e.g., a dark finish) encompassing a rear-illuminated image exhibiting member, such as a television image screen, adds substantially to the difficulties of the viewer and particularly increases eyestrain. The human eye can accommodate to only one level of brightness. Large variations in brightness between the image and the area around the image can cause eyestrain and substantial discomfort in prolonged viewing. Consequently, it is highly desirable to provide the front wall of the cabinet and the inside surfaces of shield panels 32–34 with a finish having a high diffuse reflection factor. The diffused reflection of incident light then affords a bright surround area, encompassing the image, of sufficient width to assure comfortable viewing.

Thus, the inner surfaces of each of these panels, these being the surfaces that face picture tube 16, should be coated with a light-colored paint or otherwise treated to afford a high diffuse reflection factor within the light shield. Conversely, and particularly if device 20 is to match the television receiver cabinet, the external surfaces of these panels and of the frame members on which they are mounted may be painted in a dark color or otherwise given a surface treatment affording a low diffuse reflection factor.

The cover and shield device 20 affords maximum flexibility with respect to angle of view. The second or viewing position of each shield panel is really a broad range of positions that may be adjusted to meet changing external light conditions and to accommodate a number of viewers.

FIGS. 8 and 9 illustrate another embodiment of the invention that is in most respects substantially similar to that described hereinabove in connection with FIGS. 1 through 7. In this instance, the invention is applied to a carrying case 120 that encompasses the complete cabinet of television receiver 10. Carrying case 120 fits over the cabinet of the television receiver and may be provided with a handle 121. Conversely, the handle 121 may be mounted on the television receiver and may project through a suitable opening in the top of case 120. As in the case of the cover and light shield device 20, the front portion of cover 120 affords a frame that encompasses the front cabinet wall 11 of the television receiver.

As in the previously described arrangement, there are two side panels 32 and 33 hingedly mounted upon the frame afforded by cover 120, the hinges being indicated by reference numerals 42 and 43 respectively. A top panel 34 is affixed to the television receiver cabinet cover 120 by means of the hinge 44. Auxiliary shield members 52 and 53 are pivotally mounted upon panels 32 and 33 respectively. Shield members 52 and 53 are engageable with a pair of auxiliary shield members 54 and 55, respectively, carried by the top shield panel 34. As in the previous embodiment, each of the auxiliary shield members is mechanically connected to the hinge for the shield panel with which it is associated so that the shield member is pivoted outwardly of the edge of the panel when the panel is moved beyond an angle of 90° with respect to the front cabinet wall 11.

As before, panels 32, 33 and 34 may be pivoted inwardly from the positions shown in FIGS. 8 and 9 to cover the entire front surface of cabinet wall 11. Thus, when the shield panels are in their first or closed positions, panel 34 overlaps panels 32 and 33 to afford a securely protected front cover for the television receiver or like instrument. When opened to their light shielding positions, the panel members afford a complete light shield that encompasses the viewing screen 16 from three sides, shielding the image screen from external incident light.

In each of the embodiments described hereinabove, the combination protective cover and light shield, when in light shielding position, encloses only three sides of the image exhibiting member, in this instance the face plate of the picture tube 16. Of course, a fourth shield panel can be added along the bottom to afford a light shield that completely surrounds the image. This bottom panel would not require movement beyond a 90° position relative to the front cabinet wall 11 unless the viewing screen is positioned above the eyelevel of the viewer. The bottom panel is not essential; a three-sided light shield provides satisfactory and comfortable viewing under most external light conditions because most of the incident external light impinges upon the image from above and from the sides. It is for this reason that only three-sided shields are described and illustrated herein.

It is not essential that the pivotal axes for the light shield panels be located along the outer edges of the front wall 11 of the television receiver cabinet as has been shown in the drawings. If the opening in cabinet wall 11 through which the image is viewed is relatively small, and there is a substantial width of cabinet wall around the image opening, then the shield panels may be pivoted at any desired point, inwardly of the edges of the cabinet wall 11, that still permits viewing of the complete image. The only requirement, in this connection, is that the cover and shield structure be provided with an opening sufficient to expose the complete image when the light shield is open. If desired, the side panels 32 and 33 may be foreshortened, from the bottom, so that they do not cover the control knobs and thus afford improved protection with respect to these potentially breakable portions of the television receiver.

FIGS. 10 through 13 illustrate yet another embodiment of the present invention in which the light shield and cover is mounted directly upon and forms a part of the cabinet of the television receiver. In this embodiment of the invention, the television receiver 110 has a pair of side panels 132 and 133 directly pivotally mounted upon the corners of the front cabinet wall 111 by means of the hinges 142 and 143. Panels 132 and 133 overlap each other when the panels are in their respective closed or covering positions, as shown by FIG. 10. The cover and shield construction is completed by a top panel 134 that is hingedly connected to the top front edge of the cabinet of receiver 110 by a hinge 144.

The remaining structural features of the embodiment of FIGS. 10–13 are essentially similar to those described hereinabove in connection with other embodiments of the invention. Thus, side panels 132 and 133 are provided with auxiliary shield members 152 and 153. These auxiliary shield members engage mating auxiliary shield members 154 and 155 on the top shield panel 134 when the shield is opened, as shown in FIGS. 12 and 13. In this instance, the cover and light shield is applied only to the image exhibiting member 116 of the television receiver; the controls 117 are left exposed.

In each of the foregoing embodiments of the invention, provision may be made for automatically moving the auxiliary shield members at the corners of the shield panels outwardly in response to opening of the shield panels beyond a predetermined angle. This angle need not be taken as exactly 90°; provision may be made for automatically extending the auxiliary shield panels at different angles, depending upon the configuration of the ends of the main shield panels. Furthermore, it is not always necessary to afford automatic pivoting or other advancing means for the auxiliary shield members.

Thus, the above-described embodiments of the invention can be provided with pivotal or other movable auxiliary shield members for the main shield panels that are not advanced automatically upon opening of the light shield but that are positioned manually at the time that the light shield is opened. In a shield structure of this kind, the light shield panels are first moved to shielding position and the corner sections are then pivoted or otherwise moved outwardly of the edges of the main shield panels to the desired positions, completing the corner portions of the light shield. The auxiliary corner shield members may be tightly riveted or eyeletted to the main shield panels so that they will hold their respective positions when extended for use. Another arrangement that may be employed is to afford one or more detent serrations in the mating faces of the auxiliary shield members and their associated main shield panels to hold the auxiliary shield members in their extended positions.

In those embodiments of the invention described hereinabove, the light shield panels constitute part of a protective cover assembly that may be incorporated in a removable front cover for an image exhibiting member, in a separate carrying case, or in a cabinet for an image exhibiting device. Many of the major advantages of the invention may be realized in a light shield assembly, also constructed in accordance with the invention, in which the light shield panels do not constitute a protective cover for the image exhibiting member. In a shield assembly of this type, as described in detail hereinafter in connection with FIGS. 14–19, the light shield assembly, when not in use, is completely disassociated from the image exhibiting device. The assembly may be quickly and conveniently mounted in light shielding position on the image exhibiting apparatus with which it is employed; it can be equally quickly and conveniently removed from the image exhibiting apparatus and folded or otherwise brought into a compact assembly that is easily stored and transported.

FIG. 14 illustrates, in open plan view, a light shield assembly 220 constructed in accordance with a further embodiment of the present invention. The light shield 220 comprises three panels 232, 233 and 234. Panels 232 and 234 are joined to each other along a hinge line 236, whereas panels 233 and 234 are connected along a hinge line 237. Each of panels 232–234 is a solid piece and requires no provision for changes in the planar area of the panel as by extension at the corner adjoining another panel.

Panels 232–234 may be fabricated of lightweight sheet metal or may comprise sheet plastic material, relatively thin hardboard, or other suitable materials. A conventional hinge may be used to join adjacent panels, as along the hinge line 246, the hinge being screwed or otherwise affixed to the two panels. A fabric or heavy flexible plastic material may also be used to construct the hinges joining adjacent panels. These hinges may be cemented, riveted or otherwise secured to the panels. Another construction that may be utilized is to afford a pocketed plastic or fabric cover for the individual stiffening panels, with the cover itself affording the hinges along lines 246–247.

In addition to the main light shield panels 232–234, shield assembly 220 includes three mounting panels or flanges 222–224. Mounting flange 222 is connected to light shield panel 232 along a fold line or hinge line 242. Similarly, the mounting panels 223 and 224 are joined to light shield panels 233 and 234 along hinge lines 243 and 244 respectively.

When the light shield assembly 220 is not in use, it may be folded along hinge lines 246 and 247 to a compact unit as illustrated in FIG. 17. In this condition, assembly 220 can be conveniently stored in a minimum space. Moreover, it can be conveniently transported, affording little bulk and being light in weight.

When light shield assembly 220 is to be placed in use, the assembly is opened up to the three-sided truncated pyramidal configuration shown in FIG. 15. The small base of the truncated pyramid, coinciding with hinge lines 242, 243 and 244, frames the image area of the image exhibiting member with which the shield assembly is to be used. The larger base of the truncated pyramid, along the outer edges of shield panels 232–234, is located forwardly of the image exhibiting member. Thus, and like the other embodiments of the present invention, light shield 220 functions as an effective light shield for the image exhibiting member, cutting down on undesired external light impinging upon the image surface.

Light shield 220 is mounted in position of use, with respect to an image exhibiting member, by means of the mounting panels or flaps 222–224. One mounting arrangement is illustrated in FIG. 16, in which shield 220 is shown in operative association with a television receiver 210. The mounting panel or flange 223 is secured to one wall 213 of television receiver 210 by suitable means such as a plurality of snap fasteners 225. Similar fasteners are used to secure the mounting flange for the top panel of the shield to the top wall 214 of television receiver 10. Similar fastening members 225 (see FIGS. 14 and 15) may be utilized to mount the remaining flange member 222 on the other side (not shown) of receiver 210. As in the embodiment of FIGS. 1 through 5, push pins or other simple fastening devices may be substituted for the snap fasteners 225 if desired. With the three mounting panels secured to the cabinet of television receiver 210, the light shield panels 232–234 are held in fixed alignment with respect to the face of the television receiver. Because the panels are fabricated of relatively rigid material, they assume and maintain the desired shape of a three-sided truncated pyramid.

FIGS. 18 and 19 illustrate a further light shield structure or assembly 320 that is somewhat similar to light shield 220. Shield assembly 320 comprises three individual shield panels that are similar in configuration to the shield panels shown in FIG. 14; two of these shield panels 333 and 334 are shown in the perspective view of FIG. 18. Again, the panels are formed of lightweight rigid material. Panel 333 is provided with a flange or mounting panel 323, hinged to panel 333 along line 343. Similarly, the top shield panel 334 is provided with a flange or mounting panel 324. As before, flanges 323 and 324 extend along the sides and top walls 213 and 214 of a television receiver 210.

The mounting of the shield panel on the television receiver is somewhat different in FIG. 18. An inverted U-shaped clamp member 335 extends around the top and two side walls of the cabinet of television receiver 210, tightly engaging the flanges on the light shield panel members. It is thus seen that clamp 335 affords a quick and convenient means for mounting the light shield 320 on an image exhibiting device, in this instance the television receiver 210. It will be understood that the clamp engages a corresponding flap or flange 322 on a third light shield panel to complete a three sided shield construction, holding all three of the shield panels on the television receiver.

When the light shield is relatively large, it may be desirable to strengthen the corners of the shield when the shield is in its position of use. This is particularly true if light-gauge material is utilized in the fabricating of the shield panels. To this end, a double-walled corner reinforcing member may be employed to join the panels at the corners of the shield. One such corner reinforcement 336 is shown in FIG. 19, with the two panels 333 and 334 fitted into the recesses of the corner reinforcing member. A similar reinforcement 337 may be employed at the other corner of the light shield as shown in FIG. 18.

The light shields 220 and 320 illustrated in FIGS. 14 and 19 are particularly advantageous as applied to an image exhibiting member of the front projection type. In an application of this kind, the mounting flaps or flanges of the shield panels may be secured to a frame encompassing the screen. This makes it possible to provide effective light shielding for a front projection screen in an assembly which, nevertheless, can be quickly mounted and de-mounted and can be folded to a compact assembly when not in use.

From the foregoing description and the drawings, it will be apparent that the present invention affords a new and improved combined light shield that is relatively inexpensive in construction yet affords substantial advantages as compared with previously known shields. In the embodiments of FIGS. 1 through 9 and 14 through 19, the shield assembly may be readily and conveniently removed from or re-mounted upon the image display device with which it is employed, in minimum time. The shield is compact and light in weight, facilitating storage and transportation. It is usable with virtually any form of image exhibiting apparatus where undesired incident light presents a problem. The invention is equally adaptable to a complete carrying case as shown by FIGS. 10 through 13.

In all embodiments, the shield members are constructed to be of substantial depth to afford an effective, comfortable light shield; they overlap, in folded position, to afford either a protective cover for the image exhibiting member with which they are used or simply a small, compact, storable assembly. At the same time, the auxiliary shield members used in several embodiments, usually in conjunction with automatic means for moving those auxiliary members to operative position when the shield panels are moved beyond a given angle with respect to the image surface, assure a light-tight, continuous light shield. Two protective functions are obtained from the felt or other resilient corner members used at each corner of the light shield. These members assure a light-tight shield and also cushion the individual cover members against each other when the cover is closed. In all embodiments of the invention, the inner surfaces of the shield panels should have a high diffuse reflection factor to reduce eyestrain by affording a bright surround for the image display.

Hence, while preferred embodiments of the invention have been described and illustrated, it is to be understood that they are capable of variation and modification.

I claim:

1. A light shield assembly for a television receiver, oscilloscope, slide viewer, or like image exhibiting apparatus of the kind comprising an illuminated image-exhibiting member, said assembly comprising: a plurality of shield panels; connecting means, interconnecting said shield panels in a unitary structure such that said shield panels may be aligned in first and second positions, said panels, when in said first position presenting a compact overlapping assembly, and, when in said second position, extending outwardly of each other; and means for releasably mounting said structure on an image exhibiting apparatus with said shield panels in said second position projecting forwardly of the image exhibiting member of said apparatus to shield said image-exhibiting member from undesirable external incident light.

2. A light shield assembly for a television receiver, oscilloscope, slide viewer, or like image exhibiting apparatus of the kind comprising an illuminated image-exhibiting member, said assembly comprising: a plurality of shield panels; connecting means, interconnecting said shield panels end-to-end in a unitary structure, such that said shield panels may be folded over on each other into a first position in which said panels present a compact overlapping assembly, and may be opened outwardly of each other into a second position; mounting means for releasably mounting said structure on an image exhibiting apparatus, with said shield panels in their respective second positions projecting forwardly of the image exhibiting member of said apparatus to shield said image exhibiting member from undesirable external incident light, said mounting means including a plurality of mounting flanges each secured to one of said shield panels, each of said mounting flanges, when in said second position, being located in a plane divergent from the plane of the shield panel to which the flange is secured.

3. A light shield for a television receiver, oscilloscope, slide viewer, or like image-exhibiting apparatus of the kind comprising a cabinet having a front wall and side walls and an illuminated image-exhibiting member facing outwardly of said front wall of said cabinet, said assembly comprising: a plurality of shield panels; connecting means for interconnecting said shield panels end-to-end in a unitary structure, such that said shield panels may be folded over on each other into a first position in which said panels present a compact overlapping assembly, and may be opened outwardly of each other into a second position in which said panels define a truncated pyramid; and mounting means for mounting said structure on said cabinet with said shield panels projecting forwardly and outwardly of said one cabinet wall to shield said image exhibiting member from undesirable external incident light; said mounting means comprising a corresponding plurality of mounting flanges each secured to one of said shield panels and engageable with a side wall of said cabinet, and means for releasably securing said mounting flanges to said cabinet.

4. A removable cover and light shield assembly for a television receiver, oscilloscope, slide viewer, or like image exhibiting apparatus of the kind comprising a cabinet and an illuminated image exhibiting member facing outwardly of one wall of said cabinet, said assembly comprising a plurality of shield panels and means for mounting said shield panels around the edges of said cabinet wall for movement of each panel between a first position adjacent to said cabinet and a second position projecting outwardly of said image exhibiting member, said mounting means including a frame encompassing the edges of said cabinet wall and supporting said shield panels and having a viewing opening therein through which said image exhibiting member may be viewed, and releasable means for securing said frame to said cabinet, at least one of said shield panels, when in their respective first positions, covering said viewing opening in said frame and affording a protective cover for said image exhibiting member, and said shield panels, when in their respective second positions, conjointly affording a light shield shielding said image exhibiting member from external incident light.

5. A removable protective cover and light shield for a television receiver, oscilloscope, slide viewer, or like image exhibiting apparatus of the kind comprising a cabinet and an illuminated image exhibiting member facing outwardly of one wall of said cabinet, comprising a frame member encompassing the edges of said one wall of said cabinet and having an opening exposing said image exhibiting member, releasable means for securing said frame member to said cabinet, a shield panel, and means for mounting said shield panel on said frame member for movement between a first position immediately adjacent to said one cabinet wall and a second position projecting outwardly of said wall, said shield panel, when in its first position, covering said opening in said frame member and affording a protective cover for said image exhibiting member, and said panel, when in its second position, affording a light shield shielding said image exhibiting member from external incident light.

6. A combined protective cover and light shield assembly for a television receiver, oscilloscope, slide viewer, or like image exhibiting apparatus of the kind comprising a cabinet and an illuminated image exhibiting member facing outwardly of one wall of said cabinet, said assembly comprising a removable carrying case for said cabinet, having a viewing opening therein through which said image exhibiting member is exposed to view, a plurality of shield panels, and means for mounting each of said panels on said carrying case for movement between a first position adjacent said cabinet wall and a second position projecting outwardly of said wall, at least two of said panels, when in their respective first positions, overlapping each other and said panels covering said viewing opening to afford a protective cover for said image exhibiting member, and said panels, when in their respective second positions, conjointly affording a light shield shielding said image exhibiting member from external incident light.

7. A combined protective cover and light shield assembly for a television receiver, oscilloscope, slide viewer, or like image exhibiting apparatus of the kind comprising a cabinet and an illuminated image exhibiting member facing touwardly of one wall of said cabinet, comprising a removable carrying case for said cabinet, having a viewing opening therein through which said image exhibiting member is exposed to view, a shield panel, and means for mounting said panel on said carrying case for movement between a first position adjacent said cabinet wall and a second position projecting outwardly of said wall, said panel, when in its first position, covering said viewing opening and affording a protective cover for said image exhibiting member, and said panel, when in its second position, affording a light shield shielding said image exhibiting member from external incident light.

8. A combination protective cover and light shield for a television receiver, oscilloscope, slide viewer, or like image exhibiting apparatus of the kind comprising a cabinet wall and an illuminated image exhibiting member facing outwardly of said cabinet wall, said combination comprising a plurality of shield panels, and means for mounting each of said panels on said cabinet wall for movement between a closed position in which the panel extends substantially across said cabinet wall and a range of viewing positions in which the panel projects outwardly by at least a predetermined angle relative to said cabinet wall, said panels, when in their respective closed positions, covering the surface of said image exhibiting member, with at least two of the panels overlapping each other, and affording a protective cover therefor, and said panels, when in their respective viewing positions, conjointly affording a light shield shielding said image exhibiting member from external incident light, and a plurality of auxiliary shield members, movably mounted on said shield panels adjacent the ends thereof, for extending the areas of said shield panels at the ends thereof to join the shield panels at their ends when said panels are in said viewing positions, each of said shield members normally being disposed within the outline of its associated shield panel but being movable outwardly thereof upon movement of the shield panel beyond predetermined angle relative to the cabinet wall.

9. A light shield assembly for a television receiver, oscilloscope, slide viewer, or like image exhibiting apparatus of the kind comprising an illuminated image-exhibiting member, said assembly comprising: a plurality of shield panels; connecting means, for interconecting said shield panels in a unitary structure, such that said shield panels may be folded over on each other into a first position in which said panels present a compact overlapping assembly, and may be opened outwardly of each other and maintained in a second position in which said shield panels are in the configuration of a truncated pyramid; means for mounting said structure on said image-exhibiting apparatus with said shield panels in said second position projecting forwardly of the image exhibiting member of said apparatus, with the small base of said truncated pyramid encompassing said image exhibiting member, and with the large base of said truncated pyramid away from said image exhibiting member, to shield said image exhibiting member from undesirable external incident light without unduly restricting the angle at which said image exhibiting member can be viewed.

10. A combined protective cover and light shield assembly for a television receiver, oscilloscope, slide viewer, or like image exhibiting apapratus of the kind comprising a cabinet and an illuminated image exhibiting member facing outwardly of one wall of said cabinet, said assembly comprising a removable carrying case for said cabinet, having a viewing opening therein through which said image exhibiting member is exposed to view, a plurality of shield panels, and means for mounting said panels on said carrying case for movement between a first position adjacent said cabinet and a second position projecting outwardly of said image exhibiting member, at least one of said panels, when said panels are in their respective first positions, covering said viewing opening to afford a protective cover for said image exhibiting member, and said panels, when in their respective second positions, conjointly affording a light shield shielding said image exhibiting member from external incident light.

References Cited

UNITED STATES PATENTS

| | | | |
|---|---|---|---|
| 2,482,031 | 9/1949 | Rose | 178—782 |
| 2,571,903 | 10/1951 | Loewi | 178—7.9 |
| 2,627,067 | 1/1953 | Rose | 178—7.9 |
| 2,759,178 | 8/1956 | Rose | 178—7.9 |
| 3,062,917 | 11/1962 | Rose | 312—7 |
| 3,087,014 | 4/1963 | Rose | 178—7.82 |

JOHN W. CALDWELL, *Acting Primary Examiner.*

J. A. ORSINO, *Assistant Examiner.*